June 4, 1935. T. GRAM 2,004,047
HARVESTING OF PEAT OR PEAT FORMING MATERIALS MORE ESPECIALLY
IN CONNECTION WITH THE PRODUCTION OF PEAT POWDER
Filed Nov. 13, 1933 3 Sheets-Sheet 1

T. Gram
INVENTOR

BY Marks & Clerk
Attys.

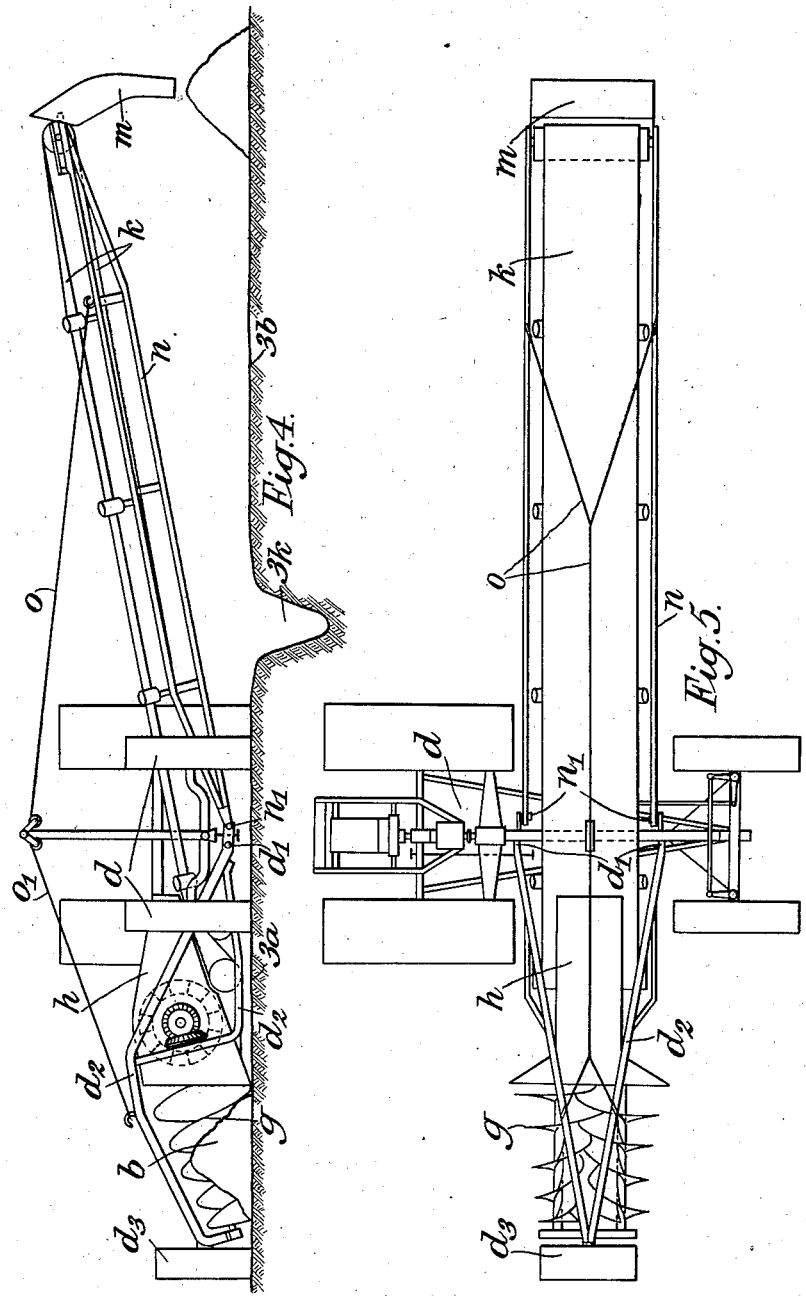

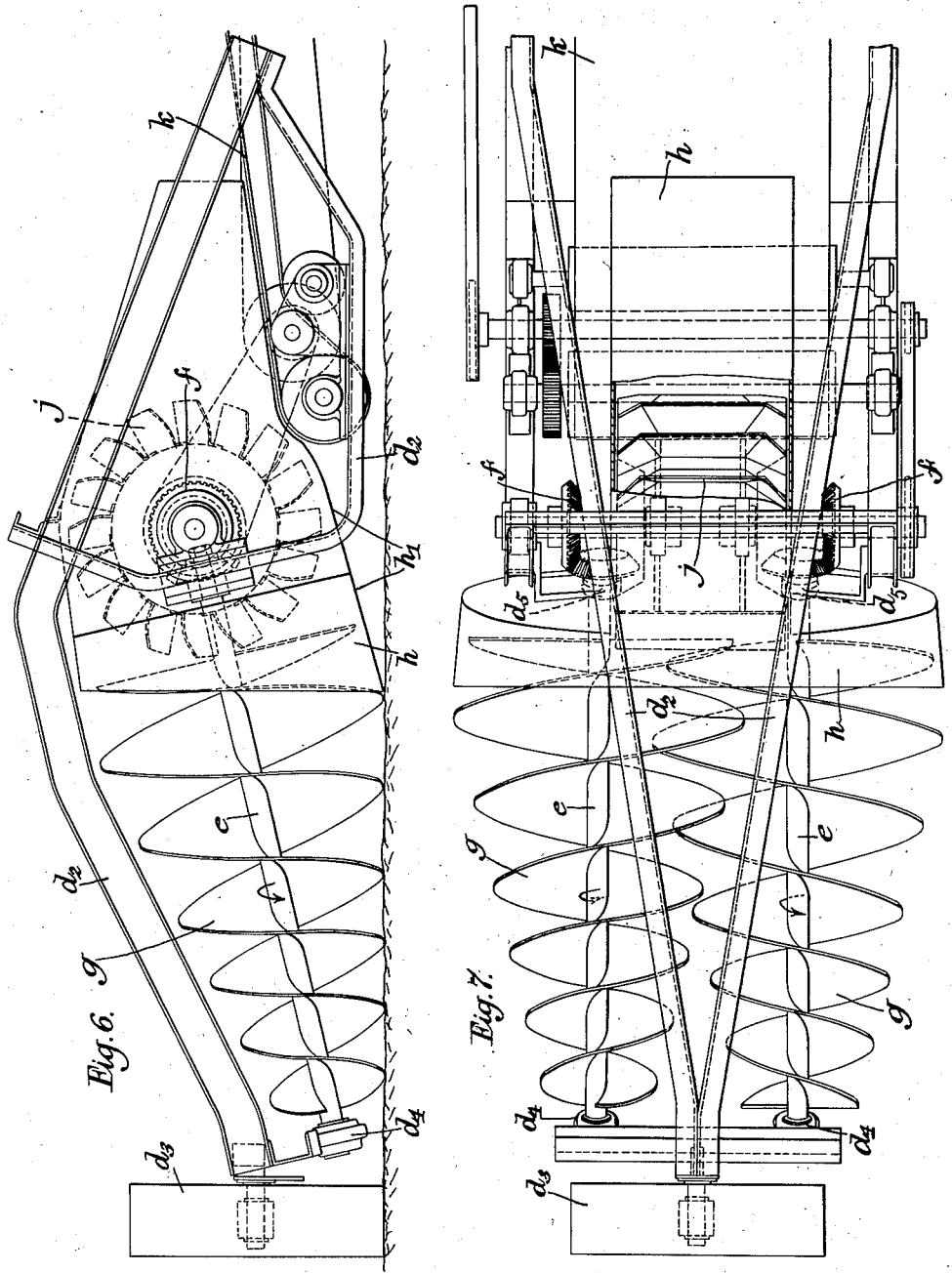

Patented June 4, 1935

2,004,047

UNITED STATES PATENT OFFICE 2,004,047

HARVESTING OF PEAT OR PEAT FORMING MATERIALS MORE ESPECIALLY IN CONNECTION WITH THE PRODUCTION OF PEAT POWDER

Thomas Gram, London, England, assignor to Techno-Chemical Laboratories, Limited, London, England Application November 13, 1933, Serial No. 697,876
In Great Britain November 19, 1932

14 Claims. (Cl. 44—27)

This invention relates to the production of partially air-dried peat powder by disintegration of the material (which may include moss-litter or undecomposed or incompletely decomposed peat-forming materials) on the surface of a peat bog, or area upon which peat has been deposited, by means of harrows, or the like, and exposure of the material in situ to the drying action of the air. It has been found that by this method partially air-dried peat powder can be produced very cheaply and the best results have been obtained when a thin layer is treated each time, say producing about 4 to 8 tons of the dry substance per acre; some 20 to 30 or more harvests per season being obtainable in this way.

The invention particularly concerns the collection or harvesting of partially air-dried peat powder in connection with the surface excavation method above mentioned.

Collection of the material is generally accomplished by means of scrapers or scoops, pushed or pulled by tractors or other means, and operating upon areas adjoining railway lines or other transport means, the material being delivered thereto in small heaps. However, as material has to be collected from considerable areas as indicated above, very appreciable distances, say of 300 to 600 feet, have to be moved over if multiplication of railway lines is to be avoided. The harvesting of the material therefore requires considerable power expenditure and involves expensive operations.

The object of the present invention is broadly to provide for satisfactory and commercially economical large scale working by surface excavation, more especially by improvements in the methods of harvesting or collecting the material and apparatus and implements suitable for carrying out such methods.

The invention consists in the production of peat powder by surface excavation and partial air drying in situ which comprises a systematic harvesting or collecting of the material, including stagewise displacement thereof from extensive drained areas to railway lines or other transport means conveniently bounding or bordering such areas.

The invention further consists in a method of harvesting surface-excavated peat comprising traversing the bog area with suitable harvesting apparatus by a succession of movements executed upon more or less adjacent bays in reverse directions in such a way as to effect a progressive lateral gathering of the material.

The invention further consists in a method in accordance with either of the two preceding paragraphs, including collection of material into ridges on one or more bays followed by movement of the material from such ridges towards a transport line by stagewise conveyance through one or more other bays with or without deposition upon one or more intervening bays.

The invention further consists in a method as above wherein material in the form of a ridge or heap is collected by rotating screw means and/or delivered towards a transport line or the like by rotating surfaces preferably in combination with endless belt conveying means.

The invention also consists in apparatus for collecting material arranged in heaps or ridges and moving it laterally, as for conveyance of partly air-dried peat in accordance with any of the preceding statements, comprising means adapted to collect and laterally displace the heaped material, means adapted to receive the material from the first means, and endless belt or like conveying means fed with the material from said second-mentioned means.

The invention also consists in apparatus according to the preceding paragraph, comprising rotatable members having spiro-helical screw or like surfaces intermeshing and adapted to operate upon heaped material to entrain the same and deliver it laterally, rotatable means operating paddlewise upon the material delivered by the rotatable members to feed the material to the endless belt or like conveyor.

The invention also consists in apparatus according to either of the two preceding paragraphs, having the region of collection of the heaped material and the region of discharge from the conveyor so set apart as to convey the material laterally a distance substantially equal to the width of one or several bays or sections of the bog or the like being operated upon.

The invention also comprises the features of improvement in connection with harvesting methods and apparatus which will be hereinafter described and set out in the claims.

Referring now to the accompanying drawings:—

Figures 4 and 5 respectively are an end elevation and a plan of a suitable construction of harvesting machine according to the invention, the first of these views showing the mode of operation;

Figures 6 and 7 are larger scale elevation and plan views respectively of certain portions of the harvesting machine shown in Figures 4 and 5.

Figure 1:
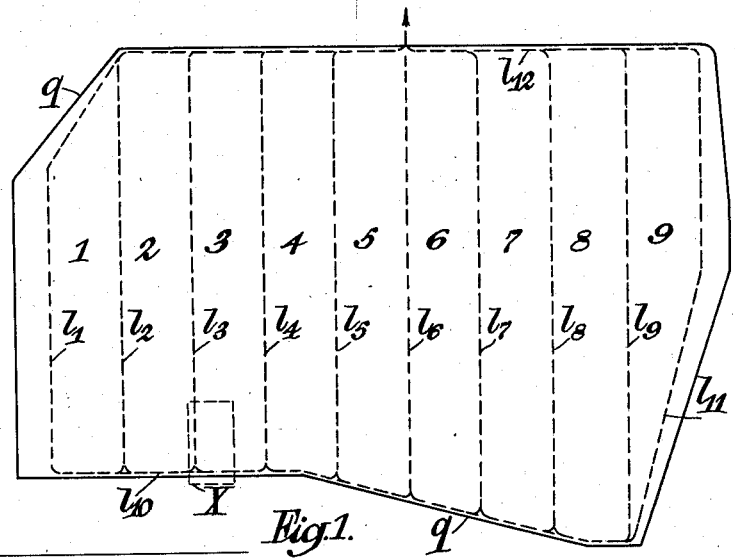
Figure 1 is a diagrammatic plan of a typical bog area such as can be economically worked according to this invention.
Figure 2:
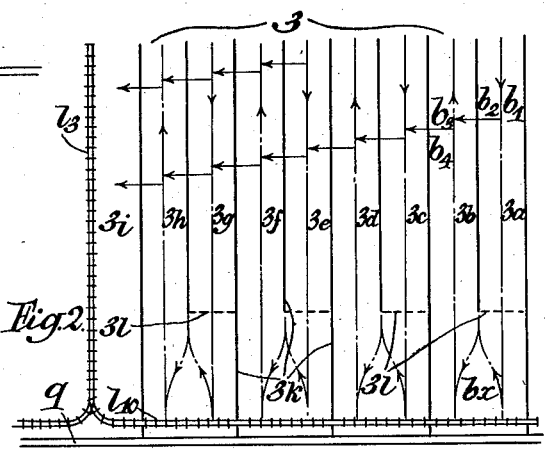
Figure 2 is an enlarged plan of the subsection of bog marked X in Figure 1.

In carrying the invention into effect in one convenient form by way of example, the whole area to be worked is furnished with railway or other transport lines substantially as shown in Figure 1, so as to subdivide it into a number of sub-areas as 1–9 each bordered by transport lines $l_1$ to $l_9$, which are connected by lines $l_{10}$ to $l_{12}$ whereby the whole working is embraced within large open ditches as $q$ provided for general drainage purposes. Each of the areas 1–9 from which is to be harvested may have a width of, say, 800 feet in a direction transverse to the transport line $l_1$, $l_2$, etc., and may be operated in longitudinal halves, each of such halves being divided as shown in Figure 2 into eight long bays $3a$ to $3h$ of 45 feet width and one $3i$ of 40 feet width, the last being occupied by the transport line as $l_3$ and as required, by heaps of material for temporary storage pending transportation. The divisions between adjacent bays may conveniently be the open drainage ditches as $3k$ (see also Figure 4) and covered ditches are also provided as at $3l$ and similarly at the other end of the sub-area so as to leave uninterrupted surfaces between the ends of adjacent bays, enabling tractors and the like to be run from one bay to another as required; such ditches being connected with the large ditches $q$ already referred to.

The length and direction of the transport lines and that of the ditches and bays are of course chosen to suit the particular formation of the bog and with due regard to the drainage system employed, and the harrowing or other disintegration of the bog surface with a view to loosening and assisting the drying of the material may conveniently be carried out between the ditches, the apparatus or implements working in the general direction of the latter.

Figure 3:
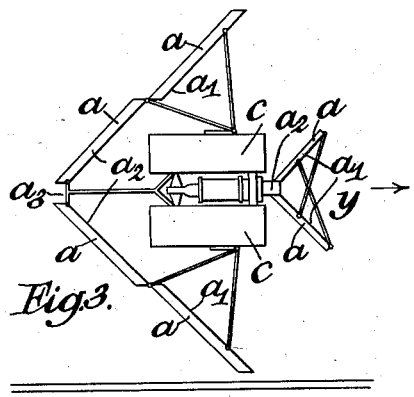
Figure 3 is a plan to a still larger scale of a section of a bay with a convenient form of collecting machine in operation thereon.

When the material is dry it is collected on each bay by lateral displacement or swept into a ridge running conveniently along the centre of the bay. This operation is conveniently carried out by means of an implement, such as is shown in plan in Figure 3. comprising mutually inclined sets of elements $a$ divergent in the general direction "$y$" in which the implement is to be moved, and being arranged to present vertical frontal surfaces $a_1$ extending across substantially the whole width of the bay and adapted obliquely to meet the material on the surface of the latter, to gather said material inwards and discharge it in a continuous heap through openings $a_2$, $a_3$ between the trailing or closer ends of said elements. Preferably these elements are suitably articulated so that surface irregularities of the bog or the like may be accommodated. Such implement may be moved along the bay by a tractor $c$ to which it may be braced as shown or other means, and may conveniently serve the whole area by traversing the bays $3a$, $3b$, etc., one after the other in alternating directions.

The material formed thus into ridges one of which is shown at $b$ in Figure 4 is later moved from one bay to another by apparatus, i. e. a harvesting machine, one form of which will be described later. The machine is so operated that when traveling along one bay, e. g. $3a$ in the direction of the arrow $b_1$, it will collect the ridged material from the middle of this, move it laterally in the direction of the arrow $b_2$ and deliver it at the middle of the next bay $3b$, for instance, upon material already ridged along the latter as explained above.

In operation, the harvesting machine may thus collect material from one bay, deliver it to a second bay on top of the ridge of material already there (see Figure 4); in the next journey which is executed in the reverse direction say along the arrow $b_3$ after the machine has been transferred as indicated by the arrow system at $b_x$ it may collect the two quantities of material together and deliver them in the direction of the arrow $b_4$ on the top of the ridge along the third bay $3c$ and so on. The speed of travel of the machine must naturally be reduced successively for each bay and as the quantity of material to be moved increases, in order to keep the quantity of material handled per hour more or less up to the capacity of the machine.

In a preferred method of operating in the way first described upon eight bays the machine may conveniently first collect the material successively from the four bays $3h$, $3g$, $3f$, $3e$ nearest to the transport line $l_3$ and deliver it to the temporary storage heap alongside the latter in the bay $3i$, and be returned so as in succession to collect the material from the more distant four bays $3a$, $3b$, $3c$, $3d$, in the same way, the accumulated material from these latter bays then being successively moved over the four empty bays to the storage heap. In this way the maximal size of heaps which have to be operated upon by the machine and the variations of the travelling speeds of the machine can be kept within convenient limits when extensive bogs are being operated upon.

Similarly one may simultaneously collect say two ridges, i. e. from adjoining bays and/or deliver material collected from one or a plurality of bays on to either one or simultaneously several bays subsequently to be traversed by the machine. The distribution of covered ditches can be such as permits the passage of the implements across the ends of more than one bay.

In a modification, which may be adopted in connection with large scale workings and appropriate transport facilities enabling large quantities of the collected material to be rapidly removed from the excavation site, a plurality of harvesting and/or ridging machines may be used. For instance two harvesters of the kind described may operate simultaneously on the bog in different bays thereof; one of such machines if desired having an operating range, e. g. having its conveyor spanning, from one bay to that immediately alongside it as described above, and the other machine having a larger operating range, e. g. so as to span from one bay across one or more adjoining bays to one more remote. A machine may or may not, as required, collect the ridged material from more than one bay more or less at the same time and/or deliver collected material on to more than one bay more or less simultaneously.

The machine while conveying material in the manner indicated can travel continuously along one bay over its full length, which may be one or more miles, only then to be moved into another more or less adjacent bay to travel along this in the reverse direction.

As will be understood, the material as a whole is handled several times when using this method, but as machines can be constructed capable of conveying very large quantities of material per hour and if desired be multiplied as above, the net quantity collected from the wide fields to the storage heaps by a given number of operating units is considerably more than when using other methods, while the power consumption is comparatively low and the operation is easy if the work is executed systematically.

The harvester apparatus above referred to for conveying the material laterally, may comprise as shown in Figures 4 to 7 a motor-driven tractor $d$ having hinged to its chassis at $d_1$ or to a trailer chassis a laterally directed framework or outrigger $d_2$ provided with a wheel $d_3$ at its extremity and supporting in suitable bearings $d_4$, $d_5$ a pair of shafts $e, e$, on parallel axes arranged with a slight upward inclination (see Figures 4 and 6) at right angles to the longitudinal axis of the tractor. The two shafts are driven by a bevel or other drive as $f, f$ and are provided with vanes or surfaces $g$ forming opposite handed spiro-helical screws which run in peripheral engagement with the ground and intermesh in the vicinity of their larger diameter ends nearest to the tractor. When oppositely rotated as shown by the arrows the screws entrain material which they meet with on either side as shown in Figure 4 and displace it inwardly towards the tractor into a suitable housing $h$ or other receiver. A paddle wheel $j$ preferably of the kind shown suitably driven and preferably geared to the screw shafts is rotatable in said receiver about a horizontal axis disposed between the screws and the tractor or chassis and parallel to the longitudinal axis. The paddle pushes the material discharged from the screws up the inclined bottom $h_1$ of the housing on to an endless belt conveyor $k$. The conveyor extends across the tractor chassis and continues for such a length as to discharge by the aid of a deflector $m$ at a region preferably at least as far away from the operative regions of the spiralled collecting members as the bays being operated upon are wide. To provide for deposition on more remote bays, the length of conveyor may be so increased as to embrace with the collector screws serving it, any practicable multiple of a bay-width. The endless conveyor $k$ is preferably carried upon an arm or jib $n$ of light lattice construction hinged at $n_1$ to the chassis and suitable lifting bonds or chains $o, o_1$ can be provided to enable the conveyor and the outrigger structure $d_2$ on the opposite side of the chassis therefrom to be raised or lowered as required. For longer conveyors intermediate wheel or like supports can be provided.

Conveniently the screw shafts $e$ may be rotated at a speed of, say, 100 revolutions per minute and the paddle wheel at, say, 120 revolutions, these members being suitably designed for efficient operation at such speeds which are of an order convenient for agricultural machines. The tractor with its supported or drawn conveyor apparatus is as above indicated driven along the bays in either direction at speeds which are reduced from bay to bay in accordance with the quantity of material thereon requiring to be conveyed.

It is understood that means other than a tractor may be employed for support and/or movement of conveyor or ridging apparatus of the kinds herein described.

It is also to be understood that further modifications and additions can be introduced both in the methods and in the apparatus above described without departing from the scope of the invention as set forth in the accompanying claims.

I also wish it to be understood that the term "transport line" used in the appendant claims is intended to cover if not otherwise clearly qualified not only railway lines but also any provision such as roadways or any elements dividing off portions of the deposit or working from other portions affording a means whereby material may be removed from the deposit after the harvesting of such portions.

I claim:—

1. In the large scale production of partly air-dried peat, loosening material from the surface of an extensive peat deposit and disintegrating it for air drying by operation upon predetermined elongated bays thereof, served by transport lines running between groups of such bays, concentrating the loosened and air dried material of each bay along the interior thereof, moving the concentrated material in turn out of one bay into another in the direction of one of such lines by substantially only lateral displacement and depositing the material in a similar concentrated form along such other bay.

2. In the large scale production of partly air-dried peat, loosening material from the surface of an extensive peat deposit and disintegrating it for air drying by harrowing operations upon predetermined elongated bays thereof, served by transport lines running between groups of such bays, concentrating the loosened and air dried material of each bay along the interior thereof, moving the concentrated material in turn out of one bay into another and again moving it, together with the material of said other bay, into a third bay, such movements being effected always towards the nearest of such lines by substantially only lateral displacement in relation to the length of the several bays and said movements ending with redeposition of the material in similar concentrated form.

3. In the large scale production of partly air-dried peat, loosening material from the surface of an extensive peat deposit and disintegrating it for air drying by harrowing predetermined elongated bays thereof, served in groups by transport lines running between such groups, laterally diverting the loosened and air dried material of each bay to form ridges along the respective interiors of said bays, moving the thus concentrated material in turn out of each bay into another normally towards the nearest of such lines by substantially only lateral displacement and redepositing the material in a similar concentrated form along such other bay.

4. The method of collecting partly air-dried disintegrated peat from the surface of an extensive area of deposit, which method comprises concentrating the said material in continuous bodies along the respective interiors of a plurality of predetermined co-adjacent elongated bays running substantially parallel to a transport line, laterally displacing the concentrated material out of one bay into another towards the said line substantially without any movement of material along a bay and in such a way that the material when displaced resumes a concentrated continuous form along said other bay, repeating such displacement of material as often as may be necessary to bring the material in the said concentrated form so that it will lie immediately alongside said line for removal from said area.

5. The method of collecting partly air-dried disintegrated peat from the surface of an extensive area of deposit, which method comprises concentrating the material in heaps extending continuously along the respective interiors of a plurality of predetermined co-adjacent elongated bays running substantially parallel to a transport line, operating on the heaps from end to end progressively to displace the material composing said heaps laterally out of one bay into another situated nearer the said line substantially without any movement of material along a bay and concluding such displacement with an operation causing the material progressively to be led out in continuous heaped form along said other bay, repeating such displacement of material as often as may be necessary to bring the material in a like extended heaped form immediately alongside said line for removal thereby, from said area.

6. The method of collecting partly air-dried disintegrated peat from the surface of an extensive area of deposit, which method comprises concentrating the material in continuous ridges extending along the respective interiors of a plurality of predetermined ditch-separated elongated bays running substantially parallel to a transport line, operating along such bays for laterally displacing the ridged material out of each bay into another disposed towards the said line substantially without any movement of material along a bay and so depositing the displaced material that it resumes a continuous ridge form extending along such other bay, repeating such operations as often as may be necessary to place the material from several bays in a like ridged form extending immediately alongside said line for removal from said area.

7. The method of displacing an elongated heap of subdivided material and redepositing it in substantially like form in predetermined substantially only laterally spaced relation to its original site, which method consists in presenting to one end of said heap surfaces helically disposed and rotatable about axes arranged transversely of the length of the heap, rotating said surfaces about said axes while advancing the surfaces into the heap to consume it endwise, receiving material from said surfaces upon further surfaces which include movable surfaces, which advance jointly with said helical surfaces and which extend laterally to a discharging point suitably spaced from said helical surfaces, propelling the material successively by said last surfaces and said movable further surfaces and discharging it.

8. The method of displacing an elongated heap of partly air-dried peaty material and redepositing it in substantially like form in predetermined substantially parallel spaced relation to its original site, which method consists in presenting to one end of said heap intermeshing screw surfaces rotatable about twin axes arranged transversely of the length of the heap, rotating said surfaces about said axes while advancing the surfaces into the heap to consume it endwise, receiving material endwise from said screw surfaces upon further surfaces which include movable surfaces, which further surfaces advance jointly with said screw surfaces and extend laterally to a discharging point suitably spaced from said screw surfaces, propelling the material successively by said last surfaces and said movable further surfaces and discharging it.

9. The method of displacing an elongated heap of subdivided peaty material and redepositing it in substantially like form in predetermined substantially only laterally spaced relation to its original site, which method consists in presenting to one end of said heap one of a pair of spiro-helical surfaces disposed and rotatable about substantially parallel axes arranged transversely of the length of the heap, rotating said surfaces in opposite senses about said axes while advancing the surfaces into the heap to entrain the material between said surfaces and consume the heap endwise, receiving material from between said surfaces upon further surfaces which include movable surfaces, which advance jointly with said spiro-helical surfaces and which extend laterally to a discharging point substantially spaced from said spiro-helical surfaces, propelling the entrained material successively by said last surfaces and by said movable further surfaces and discharging it.

10. The method of clearing peat from extensive areas where it lies in ridges extending continuously from end to end of predetermined co-adjacent elongated bays which method includes the displacement of the whole of the material constituting one such ridge into another bay and depositing it again in a similar ridge-like form extending continuously along said other bay substantially without movement of material lengthwise of said bays.

11. A method according to claim 10 including deposition of material in its said displacement upon and along another of said ridges of material to form an augmented ridge.

12. A method according to claim 10 including deposition of material in its said displacement upon and along another of said ridges of material to form an augmented ridge and the like displacement of the material forming said augmented ridge into another bay, both displacement operations being effected in the same sense transversely of said bays.

13. A method according to claim 10 comprising a number of displacement operations as set forth repeated successively from bay to bay commencing in a bay separated by at least one other bay from a transport line and terminating with displacement into an elongated ridge-like dump extending alongside said line.

14. A method according to claim 10 comprising displacement operations as set forth repeated successively from bay to bay commencing in a bay separated by at least one other bay from a transport line and terminating with displacement into an elongated ridge-like dump extending alongside said line, at least one of the displacement operations affecting a ridge of material formed by combining the materials of ridges initially occupying a plurality of bays respectively.

THOMAS GRAM.